(12) United States Patent
Engel et al.

(10) Patent No.: US 11,550,823 B2
(45) Date of Patent: Jan. 10, 2023

(54) PREPROCESSING FOR A CLASSIFICATION ALGORITHM

(71) Applicant: Siemens Aktiengesellschaft, Munich (DE)

(72) Inventors: Thomas Engel, Aalen (DE); Alexander Michael Gigler, Untermeitingen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/633,364

(22) PCT Filed: Jun. 11, 2018

(86) PCT No.: PCT/EP2018/065322
§ 371 (c)(1),
(2) Date: Jan. 23, 2020

(87) PCT Pub. No.: WO2019/020259
PCT Pub. Date: Jan. 31, 2019

(65) Prior Publication Data
US 2021/0157824 A1    May 27, 2021

(30) Foreign Application Priority Data
Jul. 26, 2017  (EP) .................................. 17183229

(51) Int. Cl.
*G06F 17/00*     (2019.01)
*G06F 16/28*     (2019.01)
(Continued)

(52) U.S. Cl.
CPC ........... *G06F 16/285* (2019.01); *G06N 20/00* (2019.01); *G06N 3/0454* (2013.01); *G06N 20/10* (2019.01)

(58) Field of Classification Search
CPC ...... G06F 16/285; G06N 20/00; G06N 20/10; G06N 3/0454
See application file for complete search history.

(56) References Cited

U.S. PATENT DOCUMENTS 9,002,492 B2 *  4/2015  Moyne ................. G05B 13/026
                                                              700/104
10,956,484 B1 *  3/2021  Kulkarni ............... G10L 15/142
(Continued)

FOREIGN PATENT DOCUMENTS

EP      3 425 519 A1     1/2019  ................ G01J 3/28
WO    2019/020259 A1    1/2019  ............. G06N 99/00

OTHER PUBLICATIONS

Theodoros Iliou et al, A Novel Machine Learning Data Preprocessing Method for Enhancing Classification Algorithms Performance. In Proceedings of the 16th International Conference on Engineering Applications of Neural Networks, Association for Computing Machinery, Article 11, pp. 1-5, (Year: Sep. 2015).*

(Continued)

*Primary Examiner* — Greta L Robinson
(74) *Attorney, Agent, or Firm* — Slayden Grubert Beard PLLC

(57) ABSTRACT

Various embodiments include a method for processing a data set comprising: obtaining a measurement dataset; applying a preprocessing algorithm to the measurement dataset to obtain a preprocessed measurement dataset; applying a classification algorithm to the preprocessed measurement dataset to classify a feature represented by the measurement dataset; determining a quality of the classification of the feature; and adjusting the preprocessing algorithm based on the determined quality. Adjusting the preprocessing algorithm comprises applying a selection algorithm. The selection algorithm describes the change in a value of a parameter of the preprocessing algorithm depending on the determined (Continued)

quality. The preprocessing algorithm comprises at least one of the following operations applied to the measurement dataset: binning; differentiation; integration; and forming tuples having a predetermined relationship from the measurement dataset.

14 Claims, 2 Drawing Sheets

(51) Int. Cl.
*G06N 20/00* (2019.01)
*G06N 20/10* (2019.01)
*G06N 3/04* (2006.01)

(56) References Cited

U.S. PATENT DOCUMENTS

| | | | | |
|---|---|---|---|---|
| 11,023,441 | B2* | 6/2021 | Mugali | G06N 5/046 |
| 2009/0221251 | A1 | 9/2009 | Yi et al. | 455/226.3 |
| 2017/0323442 | A1* | 11/2017 | Suehling | G06K 9/6229 |
| 2018/0018579 | A1* | 1/2018 | Xu | G06N 20/20 |
| 2020/0384989 | A1* | 12/2020 | Bruns | B60W 40/04 |

OTHER PUBLICATIONS

Mingzhou, Ding et al., "Deterministic point processes generated by threshold crossings: Dynamics reconstruction and chaos control," The American Physical Society, Physical Review E, vol. 55, No. 3, Mar. 1997, pp. 2397-2402, pp. the whole document.

Kadlec, Petr et al., "Architecture for development of adaptive on-line prediction models," Springer-Verlag Sep. 29, 2009, Memetic Computing, Sep. 29, 2009, Special Issue: Research Paper, vol. 1, No. 4, pp. 241-269, pp. 241-267.

Žliobaitė, Indrė et al., "Adaptive Preprocessing for Streaming Data," IEEE Computer Society, IEEE Transactions on Knowledge and Data Engineering, vol. 26, No. 2, Jul. 20, 2012, pp. 309-321, pp. 309-320.

Sharif, Babak et al., "A New Approach to Automatically Generate Optimal Poincare Plane from Discrete Time Series," Proceeding of the IEEE 28$^{th}$ Canadian Conference on Electrical and Computer Engineering (CCECE), May 3-6, 2015, pp. 581-586, pp. 581-583, Abstract , Figure 3.

Ramírez-Gallego, Sergio et al., "A survey on data preprocessing for data stream mining: Current status and future directions," Elsevier B.V, Neurocomputing, vol. 239, Feb. 14, 2017, pp. 39-57, pp. the whole document.

Salvador, Manuel Martín, "Automatic and adaptive preprocessing for the development of predictive models," http://eprints.bournemouth.ac.uk/29442/1/SALVADOR,Manuel MartinPh.D.2017.pdf, Doctor of Philosophy Thesis, 181 pages, pp. the whole document, Apr. 2017.

Extended European Search Report, Application No. 17183229.8, 10 pages, dated Jan. 18, 2018.

International Search Report and Written Opinion, Application No. PCT/EP2018/065322, 20 pages, dated Oct. 10, 2018.

* cited by examiner

PREPROCESSING FOR A CLASSIFICATION ALGORITHM

CROSS-REFERENCE TO RELATED APPLICATIONS

This application is a U.S. National Stage Application of International Application No. PCT/EP2018/065322 filed Jun. 11, 2018, which designates the United States of America, and claims priority to EP Application No. 17183229.8 filed Jul. 26, 2017, the contents of which are hereby incorporated by reference in their entirety.

TECHNICAL FIELD

The teachings of the present disclosure generally relate to the classification of at least one feature that is represented by a measurement dataset. Various embodiments of the teachings herein include the application of a preprocessing algorithm to the measurement dataset before a classification algorithm is applied to the preprocessed measurement dataset.

BACKGROUND

Artificial intelligence makes it possible to detect features in measurement datasets. By way of example, a corresponding classification of features may be used in connection with one or more of the following applications: analysis of medical data; analysis of operating data of machines; speech, image or text recognition; analysis of workpieces and materials; etc. The architecture of an example online prediction model is described in "Architecture for development of adaptive on-line prediction models" by P. Kadlec et. al., Memetic Computing, vol. 1, no. 4, Sep. 29, 2009, pages 241-269, ISSN: 1865-9284. Preprocessing methods and learning methods are in this case used to process data.

In various scenarios in connection with the classification of features, it may be desirable to optimize the quality of the classification. Techniques are known for optimizing the quality of the classification by applying a preprocessing algorithm to the corresponding measurement dataset, see, e.g., European patent application 17 179 817.6. Such techniques are comparatively static and it may often be difficult to set the preprocessing algorithm in a suitable manner.

SUMMARY

The teachings of the present disclosure include improved techniques for classifying features by way of classification algorithms. Various embodiments include techniques that overcome at least some of the abovementioned restrictions and disadvantages. For example, some embodiments include a method for operating a computer unit, said method comprising: obtaining a measurement dataset (201), applying a preprocessing algorithm to the measurement dataset (201) in order to obtain a preprocessed measurement dataset (221), applying a classification algorithm to the preprocessed measurement dataset (221) in order to classify at least one feature (277, 278) that is represented by the measurement dataset (201), determining a quality of the classification of the at least one feature, and adjusting the preprocessing algorithm based on the determined quality. Adjusting the preprocessing algorithm comprises applying a selection algorithm. The selection algorithm describes the change in a value (451, 452) of at least one parameter of the preprocessing algorithm depending on the determined quality. The preprocessing algorithm comprises at least one of the following operations applied to the measurement dataset (201): binning; differentiation; integration; and forming tuples having a predetermined relationship from the measurement dataset (221).

In some embodiments, the tuples are formed by a Poincaré section.

In some embodiments, the predetermined relationship has a connection with a physical and technical context of the measurement dataset (201), such that the predetermined relationship comprises a temporal, spatial, energy-based, frequency-based or wavelength-based relationship.

In some embodiments, the method furthermore comprises: determining a physical and technical context of the measurement dataset (201), and selecting an operation used by the preprocessing algorithm from a multiplicity of candidate operations based on the determined physical and technical context of the measurement dataset (201).

In some embodiments, the method furthermore comprises applying a further classification algorithm to the measurement dataset (201) in order to determine the physical and technical context of the measurement dataset (201).

In some embodiments, the application of the preprocessing algorithm, the application of the classification algorithm, the determination of the quality and the adjustment of the preprocessing algorithm is repeated in an iterative loop over a plurality of iterations.

In some embodiments, the iterative loop has a stop criterion that is optionally selected from the following group: number of iterations; change in the quality of the classification between two iterations; and absolute value of the quality of the classification.

In some embodiments, the selection algorithm comprises optimizing the quality by changing the value (451, 452) of the at least one parameter over a plurality of iterations of the loop.

In some embodiments, the selection algorithm determines the change in the value (451, 452) of the at least one parameter depending on at least one of the following elements: a physical and technical context of the measurement dataset (201); a classification result of the classification algorithm; and the quality.

In some embodiments, the method furthermore comprises: applying at least one further classification algorithm to the preprocessed measurement dataset (221) in order to classify the at least one feature, wherein the at least one further classification algorithm is different from the classification algorithm, and comparing a classification result of the at least one further classification algorithm with a classification result of the classification algorithm, wherein the quality is determined based on the comparison.

In some embodiments, the comparison takes into consideration different weights for the classification result of the at least one further classification algorithm and for the classification result of the classification algorithm.

In some embodiments, the preprocessing algorithm brings about a change in the amount of data in the preprocessed measurement dataset (221) in comparison with the measurement dataset (201).

In some embodiments, the method furthermore comprises: training the classification algorithm based on reference measurement datasets, wherein the preprocessing algorithm is not trained or is trained separately from the classification algorithm.

As another example, some embodiments include a device (101) comprising: a computer unit (105), a memory (106), wherein the computer unit (105) is configured so as to load and to execute program code from the memory in order to execute a method, which comprises: obtaining a measurement dataset (201), applying a preprocessing algorithm to the measurement dataset in order to obtain a preprocessed measurement dataset (221), applying a classification algorithm to the preprocessed measurement dataset (221) in order to classify at least one feature (277, 278) that is represented by the measurement dataset (221), determining a quality of the classification of the at least one feature, and adjusting the preprocessing algorithm based on the determined quality. Adjusting the preprocessing algorithm comprises applying a selection algorithm, wherein the selection algorithm describes the change in a value (451, 452) of at least one parameter of the preprocessing algorithm depending on the determined quality, wherein the preprocessing algorithm comprises at least one of the following operations applied to the measurement dataset (201): binning; differentiation; integration; and forming tuples having a predetermined relationship from the measurement dataset (221).

In some embodiments, the method comprises a method as described above.

BRIEF DESCRIPTION OF THE DRAWINGS

The features set forth above and features that are described below may be used not only in the corresponding combinations that are explicitly set forth, but rather also in further combinations or on their own, without departing from the scope of protection of the present disclosure.

DETAILED DESCRIPTION

Figure 1:
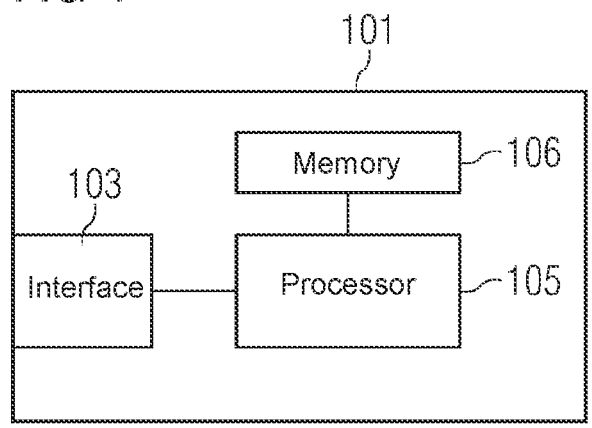
FIG. 1 schematically illustrates a device incorporating teachings of the present disclosure.

In some embodiments, a method comprises obtaining a measurement dataset. The method furthermore comprises applying a preprocessing algorithm to the measurement dataset. A preprocessed measurement dataset is thereby obtained. The method also comprises applying a classification algorithm to the preprocessed measurement dataset. At least one feature that is represented by the measurement dataset and/or the preprocessed measurement dataset is thereby classified. The method also comprises determining a quality of the classification of the at least one feature and adjusting the preprocessing algorithm based on the determined quality.

The measurement dataset may for example correspond to a series of measurements with a multiplicity of input variables having associated measured values. The measurement dataset may thus contain a multiplicity of data points. The measured data may represent one or more physical observables, for example an absorption spectrum, a transmission spectrum, distance, vibration, temperature, moisture, pressure, acceleration, volume, sound spectrum, etc.

A very wide variety of preprocessing algorithms may be applied. In some embodiments, the preprocessing algorithms reduce a number of data points in the measurement dataset such that the preprocessed measurement dataset contains a lower number of data points may be applied. It is also possible to apply preprocessing algorithms that take into consideration a physical and technical context of the measurement dataset in order thereby to achieve high accuracy in connection with the classification of the at least one feature.

In some embodiments, the preprocessing algorithm may be defined separately from the classification algorithm. By way of example, it would thus be possible for the classification algorithm to be trained based on reference measurement datasets, the preprocessing algorithm however not being trained, or in any case being trained separately from the classification algorithm.

By way of example, the classification algorithm could also be referred to as a data-driven model because it typically trains on and learns using measured data and additional information with regard to the exact classification, which is also referred to as ground truth. The classification algorithm could for example comprise an artificial neural network (ANN), for example an ANN having one or more convolutional layers (convolutional neural network, CNN). The ANN may have an input layer, an output layer and one or more hidden layers. The classification algorithm could also comprise a linear PLS (partial least squares) regression. Conventional filters, for example a Kalman filter, could also be used. Generally speaking, a learning classification algorithm may be used. The classification algorithm could comprise a support vector machine (SVM) and/or a cluster method and/or a decision tree and/or a PLS regression, in particular a PLSDA regression.

The quality of the classification may be defined with respect to various criteria. In some embodiments, the quality of the classification to be defined with respect to an accuracy or reliability with which the at least one feature is able to be assigned to a particular class. This means that the quality of the classification can be particularly great when an uncertainty with which the feature is detected and classified is low. In some embodiments, the quality of the classification may be defined with respect to a period of time required for the classification or computing resources required for the classification. If for example a large amount of computing resources is required, then the quality of the classification could be comparatively low. The quality could also be defined as to how well the classification performs depending on the number of input datasets that are used with associated ground truth.

By way of example, adjusting the preprocessing algorithm could mean that a particular operation defined by the preprocessing algorithm and by way of which the measurement dataset is modified is changed; for example, a suitable operation could be selected from a number of candidate operations. Examples of such operations that are applied to the measurement dataset by the preprocessing algorithm comprise: scaling; binning; differentiation; and integration. Further examples for the preprocessing algorithm comprise: forming tuples having a predetermined relationship from the measurement dataset, for example using a Poincaré section. Various predetermined relationships may in this case be taken into consideration. For example, the predetermined relationships could comprise a connection with the physical and technical context of the measurement dataset, that is to say for example a temporal, spatial, energy-based, frequency-based or else wavelength-based relationship.

In some embodiments, adjusting the preprocessing algorithm could mean that the value of at least one parameter of the preprocessing algorithm is changed; this means that for example the magnitude or another boundary condition of a corresponding operation by way of which the measurement dataset is modified is changed.

By way of the techniques described above, feedback that adjusts the preprocessing algorithm on the basis of the quality of the classification is thus achieved. The preprocessing algorithm is able to be suitably adjusted through such feedback in order for example to maximize the quality or in general to tailor it to the extreme. It may in particular be possible, by way of the techniques described herein, in the case of large parameters—that is to say if a large number of adjustments of the preprocessing algorithm are possible—to reliably find the suitable adjustment.

It is possible to achieve decoupling of preprocessing and classification by virtue of the provision of the preprocessing algorithm and of the classification algorithm. This may be used to compensate or to reduce influences of the respective measurement arrangement—that is to say of the corresponding physical and technical context—in the preprocessing. A medically permitted classification algorithm could thus for example be used safely, for instance in connection with a binning operation or rescaling operation of the preprocessing algorithm.

In some embodiments, a physical and technical context of the measurement dataset may be determined. An operation used by the preprocessing algorithm may then be selected from a multiplicity of candidate operations based on the determined physical and technical context. This means that, a priori, one or more suitable operations of the preprocessing algorithm may be selected from the number of candidate operations and these selected preprocessing algorithms are then adjusted—possibly iteratively—on the basis of this selection. The physical and technical context may thus as it were define the starting point for a—possibly iterative—adjustment of the preprocessing algorithm. This is based on the finding that, in some cases, certain operations, due to the nature of the data points in the measurement datasets, may be particularly suitable for maximizing the quality of the classification. By way of example, depending on physical observables represented by the measurement dataset, particular neighborhood relationships could exist between the data points; by suitably selecting the operations, it could for example be ensured that these neighborhood relationships are not suppressed or deleted by applying the preprocessing algorithm defined in this way.

Various techniques may be used in order to determine the physical and technical context. For example, use could be made of control data that are associated with the measurement dataset; these control data could explicitly describe the physical and technical context. The physical and technical context could sometimes however not be immediately available. In such a case, a second classification algorithm could be applied to the measurement dataset in order to determine the physical and technical context of the measurement dataset. This second classification algorithm may be defined separately from the classification algorithm for classifying the at least one feature; the second classification algorithm specifically serves not to classify the at least one feature, but rather to classify the physical and technical context that may be defined for example in an abstract manner by specific features. The suitable preprocessing algorithm may be found in a particularly reliable manner using the second classification algorithm, even if for example no control data that explicitly describe the physical and technical context of the measurement dataset are present.

It is possible for the feedback to be executed iteratively in a loop. By way of example, it would thus be possible for the application of the preprocessing algorithm, the application of the classification algorithm, the determination of the quality and the adjustment of the preprocessing algorithm to be repeated in an iterative loop over a plurality of iterations. Since a plurality of iterations of the loop are performed, it may be particularly easily possible for example to maximize the quality of the classification or in general to tailor it to the extreme. In particular, it is not necessary to apply any closed models for adjusting the preprocessing algorithm, but rather a particularly suitable preprocessing algorithm may be found by iteratively adjusting little by little. Such a numerical implementation is able to be used in a particularly robust and flexible manner.

In this case, it is possible for the classification algorithm(s) not to be adjusted or not to be significantly adjusted when performing the loop. That is to say that a fixed classification algorithm may be used, whereas the preprocessing algorithm is adjusted. By way of example, it would be possible for the classification algorithm to have been trained separately, for example on the basis of one or more reference measurement datasets that contain the same or a comparable physical and technical context as the measurement dataset.

In this case, the iterative loop could have a stop criterion that is optionally selected from the following group: number of iterations; change in the quality of the classification between two iterations; and absolute value of the quality of the classification.

It is thereby able to be ensured that a suitable number of iterations of the loop is performed; for example taking into account the total required period of time, on the one hand, and the reliability with which the quality is able to be maximized, on the other hand.

Adjusting the preprocessing algorithm comprises applying a selection algorithm. This selection algorithm describes the change in a value of at least one parameter of the preprocessing algorithm depending on the determined quality. This means that the selection algorithm is ultimately able to provide the magnitude of the change in the value of the at least one parameter of the preprocessing algorithm. This means that the change in the value may correlate with the determined quality. The quality is thereby able to be maximized in a particularly efficient manner.

It would be possible for example for the selection algorithm to comprise optizing the quality by changing the at least one parameter over a plurality of iterations of the loop. Suitable optimizations are known that make it possible to run through the parameter space in an efficient and targeted manner in order thereby to quickly maximize the quality. In some embodiments, the selection algorithm could determine the change in the value of the at least one parameter depending on at least one of the following elements: the physical and technical context of the measurement dataset; a classification result of the classification algorithm; and the quality.

This means that for example different variations in the value of the at least one parameter of the preprocessing algorithm could be used for different types of measurement datasets. Accordingly, different variations in the value of the at least one parameter of the preprocessing algorithm could be used for different identified features. The quality is thereby able to be maximized in a particularly tailored manner. This may make it possible to find the suitable preprocessing algorithm particularly quickly.

In the various examples described herein, different techniques could be used in order to determine the quality. One exemplary technique comprises using a multiplicity of different classification algorithms. For example, different ANNs could be used, that is to say differently trained ANNs or else ANNs containing different layers. One or more ANNs could however also for example be combined with an SVM, etc.

The method could thus for example furthermore comprise applying at least one further classification algorithm to the preprocessed measurement dataset in order to classify the at least one feature. In this case, the at least one further classification algorithm may be different from the classification algorithm. The method may also comprise comparing a classification result of the at least one further classification algorithm with a classification result of the classification algorithm. The quality is then able to be determined based on the comparison. For example, it could thus be taken into consideration whether there is a large scatter in the classification results; this may be for example an indicator of low quality. The quality is thereby able to be determined in a particularly reliable manner.

The comparison could in this case take into consideration different weights for the classification result of the at least one further classification algorithm and for the classification result of the classification algorithm. This means that, in connection with the comparison, the classification results of different classification algorithms may be taken into consideration to different extents.

By way of example, the weights could be selected based on a priori knowledge about the suitability of a particular classification algorithm for the classification in connection with the determined physical and technical context of the measurement dataset. It is thus able to be taken into consideration that some classification algorithms are more suitable for classifying the at least one feature than others. The quality is thereby able to be determined in a particularly accurate manner.

In some embodiments, a device comprises a computer unit and a memory. The computer unit is configured so as to load and to execute program code from the memory and to execute a method based on the executed program code. The method comprises obtaining a measurement dataset and applying a preprocessing algorithm to the measurement dataset. A preprocessed measurement dataset is thereby obtained. The method also comprises applying a classification algorithm to the preprocessed measurement dataset in order to classify at least one feature that is represented by the measurement dataset. The method also comprises determining a quality of the classification of the at least one feature and adjusting the preprocessing algorithm based on the determined quality.

In some embodiments, a computer program product comprises program code that is able to be executed by at least one processor. Executing the program code brings about the effect whereby the processor executes a method. The method comprises obtaining a measurement dataset. The method furthermore comprises applying a preprocessing algorithm to the measurement dataset. A preprocessed measurement dataset is thereby obtained. The method also comprises applying a classification algorithm to the preprocessed measurement dataset. At least one feature that is represented by the measurement dataset is thereby classified. The method also comprises determining a quality of the classification of the at least one feature and adjusting the preprocessing algorithm based on the determined quality.

A computer program comprises program code that is able to be executed by at least one processor. Executing the program code brings about the effect whereby the processor executes a method. The method comprises obtaining a measurement dataset. The method furthermore comprises applying a preprocessing algorithm to the measurement dataset. A preprocessed measurement dataset is thereby obtained. The method also comprises applying a classification algorithm to the preprocessed measurement dataset. At least one feature that is represented by the measurement dataset is thereby classified. The method also comprises determining a quality of the classification of the at least one feature and adjusting the preprocessing algorithm based on the determined quality.

The above-described properties, features, and advantages of the teachings herein and the way in which they are achieved will become clearer and more clearly comprehensible in connection with the following description of the exemplary embodiments that are explained in more detail in connection with the drawings. Identical reference signs denote identical or similar elements in the figures. The figures are schematic representations of various embodiments of the teachings herein. Elements illustrated in the figures are not necessarily illustrated true to scale. Rather, the various elements illustrated in the figures are reproduced in such a way that their function and general purpose becomes comprehensible to a person skilled in the art. Connections and couplings illustrated in the figures between functional units and elements may also be implemented as an indirect connection or coupling. A connection or coupling may be implemented in wired or wireless form. Functional units may be implemented as hardware, software or a combination of hardware and software.

A description is given below of techniques for classifying one or more features that are represented by a measurement dataset. For this purpose, one or more classification algorithms may be applied to the various examples described herein. The techniques described herein are in this case not restricted to a specific classification algorithm; rather, a very wide variety of types of classification algorithms may be used in the various examples. By way of example, an ANN or a CNN or an SVM or a PLS regression or a PLSDA regression could be used.

Various examples described herein are based on the finding that it may often be desirable to process the measurement dataset by applying a preprocessing algorithm in order to obtain a preprocessed measurement dataset before the corresponding data are fed to the classification algorithm. In this case, various effects may be achieved by applying the preprocessing algorithm—depending on the preprocessing algorithm and/or depending on the measurement dataset. By way of example, it would be possible to obtain a preprocessed measurement dataset that contains a reduced amount of data by applying the preprocessing algorithm; it could thereby be possible to apply the classification algorithm particularly quickly and with comparatively little loading of computer resources. In some embodiments, a preprocessed measurement dataset that has a changed data structure that allows particularly reliable or accurate classification of features in the corresponding preprocessed measurement dataset to be obtained by applying the preprocessing algorithm.

This finding is intended to be described below with reference to one illustrative example. For example, spectroscopic methods are used in many areas of chemistry, food chemistry or biochemistry, as well as biology and medicine, to determine or classify substances and/or system states. Such spectroscopic methods are typically based on the fact that recorded optical spectra are used as a characteristic fingerprint of the atomic/chemical/molecular composition of the investigated sample for analysis purposes. In order to be able to use a recorded spectrum for classification purposes, it may often be necessary to provide a priori knowledge about the typical properties of the classes to be distinguished—that is to say a priori knowledge regarding the physical and technical context of the corresponding measurement dataset. Thus, for example, peaks of the signal are often analyzed in predefined ranges of the spectrum in order to analyze the water or oxygen content and thus isolate conspicuous test samples. If the intention is however to investigate substances whose atomic/molecular/biochemical properties are not known or are only partially known, it is typically not possible to use such techniques.

One example of this is the classification of tumor cells by way of optical spectra in the near infrared range. In such a scenario, learning techniques such as for example ANNs or a linear regression, for instance a PLS regression, could be used for example as classification algorithms. In this case, the spectra are recorded as high-dimensional vectors of size (1*n) that contain a large number of individual features according to the resolved wavelengths. In such an interpretation of the spectra, however, information is often lost since spectral data constitute a one-dimensional sequence of values with a physically reasoned order. This means that neighborhood relationships between individual energy channels of the spectrum also contain meaningful information with regard to the classification. In this case, in many reference implementations, the values measured in the various channels are however analyzed by the classification algorithm without taking into consideration such neighborhood relationships. Such neighborhood relationships may however also be taken into consideration by way of suitable classification algorithms—for example by way of an ANN.

In particular in such scenarios in which neighborhood relationships are taken into consideration, it may be desirable to apply a preprocessing algorithm to the corresponding measurement dataset in order to obtain a preprocessed measurement dataset. In this case, the preprocessing algorithm should however take such neighborhood relationships into consideration to the extent that these are not suppressed or falsified in another way by the preprocessing.

Various preprocessing algorithms are conceivable in this case. By way of example, the preprocessing algorithm could apply at least one of the following operations to be measurement dataset: scaling; binning; differentiation; and integration. A Poincaré section would also be conceivable. It would for example be possible for the amount of data in the preprocessed measurement dataset to be changed with respect to the amount of data in the measurement dataset by the preprocessing algorithm; by way of example, the amount of data in the measurement dataset could in particular be reduced. By reducing the amount of data in the preprocessed measurement dataset, the application of the classification algorithm may typically be sped up or the required computer resources may be reduced.

In a binning technique, the number of data points of the measurement dataset is established, which number is combined in connection with measured value sections to form a combined data point of the preprocessed measurement dataset. The measured value sections may vary as a function of the position in the measurement dataset. Furthermore, the offset of the individual measured value sections may also possibly be suitably established in the context of the binning.

For example, one or more conjugated data points of the measurement dataset could be combined in an individual data point or a tuple of the preprocessed measurement dataset. Conjugated data points may for example be present in a measurement dataset containing optical spectra if the mostly integer multiples of the output energy are assigned to data points with low energy as spectral harmonics, that is to say for example the data point of 0.5 eV combined with those of 1 ev, 1.5 eV and 2 eV in a tuple.

In some embodiments, this may for example mean that redundant data points of the measurement dataset are combined in a data point of the preprocessed measurement dataset. For example, redundant data points could be present when a physical and technical resolution of a measurement principle used to record the measurement dataset is lower than the resolution of the data structure of the measurement dataset.

It is apparent therefrom that in principle a wide variety of techniques may be used in connection with the preprocessing algorithm. A description is therefore given herein of how one or more suitable operations and/or values of a parameter may be determined for the preprocessing algorithm. Particularly good results may thereby be made possible in connection with the application of the classification algorithm—that is to say for example a high accuracy when classifying the at least one feature and/or a significant reduction in the required computer resources and/or a significant reduction in the number of required measurement datasets and ground truth data in order to train the classification algorithm.

It may thus be possible to improve the preprocessing algorithm by way of the techniques described herein. In some examples, this is achieved by adjusting the preprocessing algorithm based on a quality of the classification of one or more features. In particular, in this case, a feedback loop may be used in some examples, wherein the quality of the classification of the at least one feature may be taken into consideration in the context of the feedback loop by way of the classification algorithm. The feedback loop may be repeated over a plurality of iterations until a stop criterion is met.

For example, the quality of the classification could describe an accuracy or reliability with which the at least one feature is classified. As an alternative or in addition, the quality of the classification could also describe a period of time or the required computer resources that are required for the classification.

By way of example—if a high quality of the classification is established—no or only a slight adjustment of a value of at least one parameter of the preprocessing algorithm could be made; if however a comparatively low quality of the classification is established, then a comparatively greater adjustment of the value of at least one parameter of the preprocessing algorithm may be made, or the operation of the preprocessing algorithm that is used may even be changed. The influence of such a change on the quality of the classification could then for example be taken into consideration.

In this case, in the various examples described herein, different techniques may be used in order to determine the quality of the classification. By way of example, the quality could be determined based on a proportion of the features of the measurement dataset that are not to be assigned to any class defined by the classification algorithm. As an alternative or in addition, the quality could be determined on the basis of a confidence level of classification results of the classification algorithm: for example, classification algorithms that also provide a reliability of the classification in addition to the result of the classification are known. In this case, a high reliability may correspond to a high quality—and vice versa. In a further example—as an alternative or in addition to the techniques described above—a comparison between the classification results of a multiplicity of different classification algorithms could be taken into consideration when determining the quality. In this case, a high scatter of the classification results could for example mean a low quality—and vice versa. Such a comparison could in particular be performed in a weighted manner, that is to say different weights could be taken into consideration for different classification results that are associated with different classification algorithms. It could thereby be taken into consideration that some classification algorithms are more or less suitable for classifying particular features.

In principle, the techniques described herein may be used for example in a calibration phase. It would thus for example be possible to adjust the values of parameters of different preprocessing algorithms and/or to select suitable operations on the basis of reference measurement datasets. In the case of intended use on the basis of a priori unknown measurement datasets, a set of rules may then already be present in order to select the suitable calibrated preprocessing algorithm depending on the respective measurement dataset.

FIG. 1 illustrates aspects in relation to a device 101 that is programmed for the various techniques described herein. The device 101 comprises an interface 103. Measurement datasets are able to be obtained via the interface 103, for example from a suitable measurement device. The device 101 also comprises a processor 105 and a memory 106. By way of example, program code could be stored in the memory 106 and loaded by the processor 105 from the memory 106. The processor 105 could then execute the program code. Executing the program code may bring about the effect whereby the processor 105 performs techniques as are described herein, for example in connection with: applying a preprocessing algorithm to the measurement dataset; applying a classification algorithm to a preprocessed measurement dataset in order to classify at least one feature; determining a quality of the classification; and adjusting the value of one or more parameters of the preprocessing algorithm.

Figure 2:
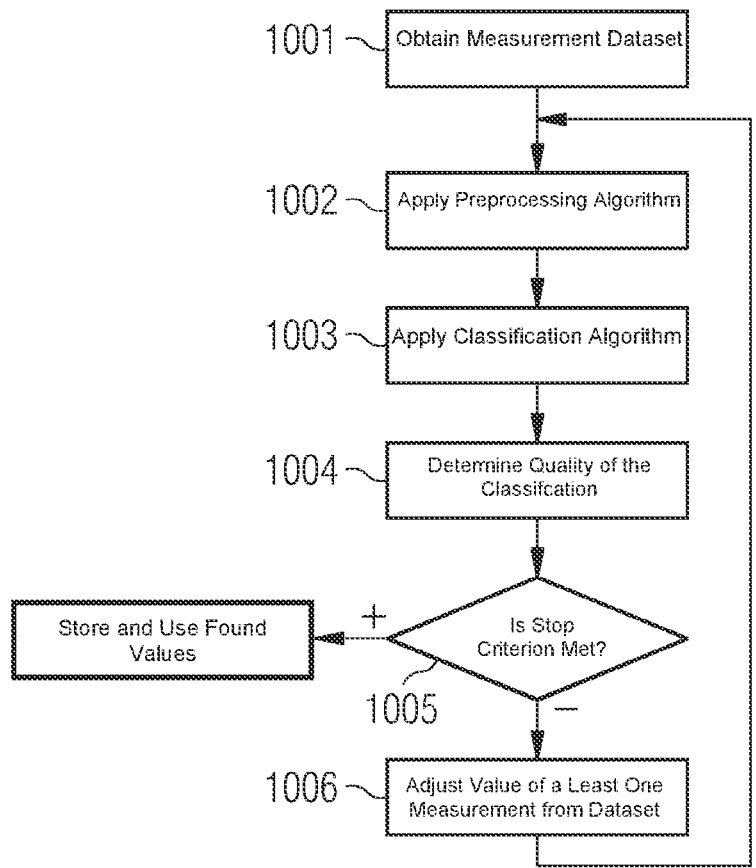
FIG. 2 is a flowchart of an exemplary method incorporating teachings of the present disclosure.

FIG. 2 is a flowchart of an exemplary method. The method could for example be executed by the processor 105 of the device 101. The quality with which one or more features of a measurement dataset are able to be classified by a classification algorithm is able to be improved by way of the method from FIG. 2. In this case, various classification algorithms may be used, for example ANNs or CNNs or deep learning or SVM, etc.

First of all, a measurement dataset is obtained in block 1001. For example, the measurement dataset could be recorded by way of a suitable measurement device. In this case, various measurement datasets may be taken into consideration, for example spectroscopic data, image data of an imaging medical method, for example computed tomography measured data or magnetic resonance measured data or ultrasound measured data, material testing measured data (for example obtained via x-ray inspection or surface analysis), etc.

A preprocessing algorithm is then applied to the measurement dataset from block 1001 in block 1002. In this case, a determined value is used for a parameter of the preprocessing algorithm. By way of example, a predefined standard value could be used for the parameter in the first iteration of block 1002.

At least one particular operation defined by the preprocessing algorithm, for example a standard operation, is furthermore used. In this case, as described above, a very wide variety of preprocessing algorithms may be used. For example, it would be possible in some examples to determine a physical and technical context of the measurement dataset and then to select the operation of the preprocessing algorithm from a multiplicity of candidate operations based on the determined physical and technical context.

For example, the physical and technical context could describe a physical observable represented by the measurement dataset, a measurement principle, a measurement resolution, a number of data points, a measurement time, etc. The physical and technical context may thus contain meta-information with regard to the measurement dataset.

Figure 3:
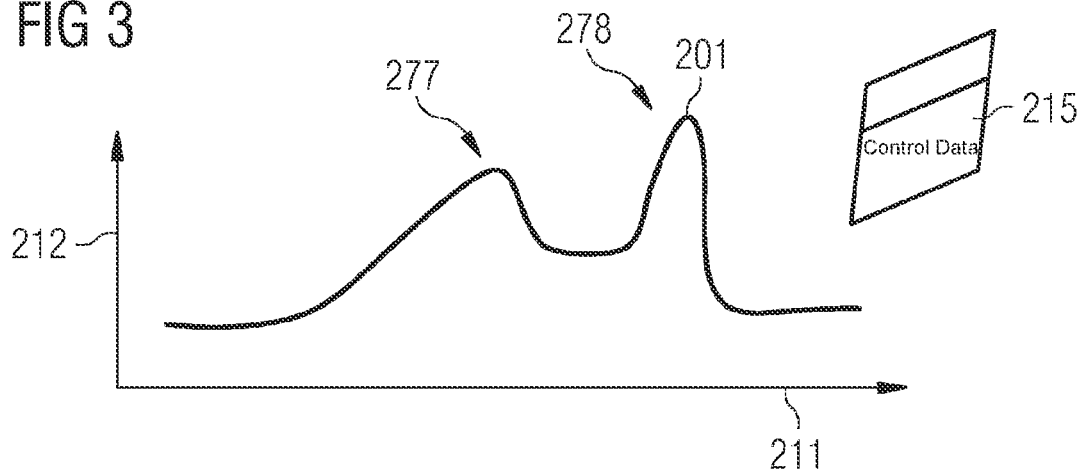
FIG. 3 schematically illustrates a measurement dataset incorporating teachings of the present disclosure.
Figure 4:
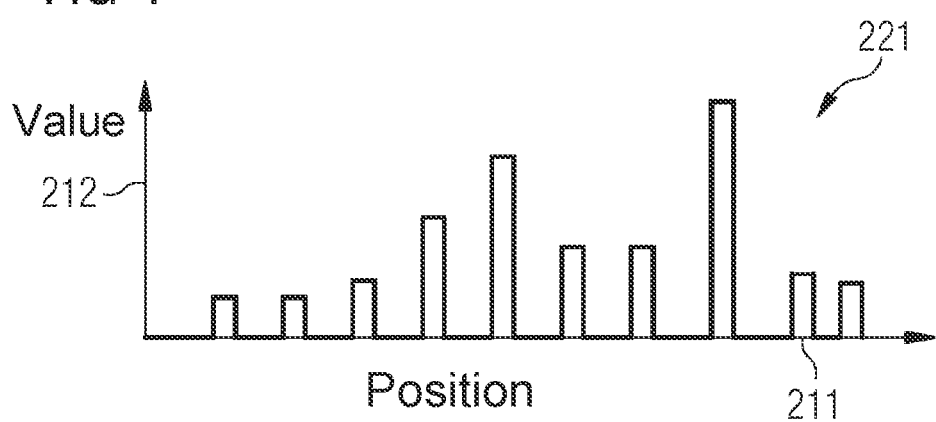
FIG. 4 schematically illustrates a preprocessed measurement dataset incorporating teachings of the present disclosure.

Reference is made to FIG. 3 and FIG. 4: these illustrate aspects with regard to the application of the preprocessing algorithm in block 1002. FIG. 3 illustrates for example a measurement dataset 201: in this case, data points at particular positions 211 having particular values 212 are described by the measurement dataset 201. Two features 277, 278 are represented in the form of local peaks.

The measurement dataset 201 is furthermore also associated with control data 215. By way of example, the control data 215 could describe the physical and technical context of the measurement dataset. For example, the control data 215 could describe information with regard to the measurement device that is used, the physical observables that are observed, the measurement time, the measurement resolution, the measurement range, etc. It is not necessary for the control data 215 to be present in all of the examples.

FIG. 4 then illustrates the preprocessed measurement data 221 as are obtained by applying the preprocessing algorithm 221 to the measurement data 201. The preprocessing algorithm is associated with a binning technique in the example of FIG. 4: this means that neighboring data points in the measured data are combined using a corresponding compilation parameter of the preprocessing algorithm into an average value. Such combined data points may also be referred to as conjugated data points. By virtue of the binning, the preprocessed measurement dataset 221 has a reduced amount of data in comparison with the measurement dataset 201.

The size of the preprocessed measurement dataset is then smaller by roughly a factor that corresponds in numerical terms to a compilation parameter of the binning. It is then furthermore possible to generate a plurality of substantially different preprocessed measurement datasets to form a fixed compilation parameter, these differing from one another in terms of the initial data point of the measurement dataset starting from which neighboring data points start to be combined up to the value of the compilation parameter. This means that, although different preprocessed measurement datasets may have the same reduced size in comparison with the measurement dataset, different neighboring data points are combined. This technique of combining the data points may be described by a further parameter that defines the starting value. The size of the amount of data of one of the preprocessed measurement datasets is thereby reduced by a factor that is defined by the fixed compilation parameter; it is nevertheless possible to generate a number of different preprocessed measurement datasets, for example in various iterations of 1002. This is achieved by varying the initial data point of the measurement dataset defined by the starting value starting from which compilation is in each case performed using the compilation parameter. The number of different preprocessed measurement datasets is therefore equal to the size of the compilation parameter minus one. These different preprocessed measurement datasets may then be fed to the classification algorithm(s).

In one example, the amount of data in the preprocessed measurement dataset could thereby also be increased in comparison with the amount of data in the measurement dataset. It would thus be possible to arrange the different preprocessed measurement datasets in lines in an array with increasing starting value for the first data point in order to apply the binning operation with the compilation parameter. The further processing for determining optimized parameters of the preprocessing algorithm could thus also take place using image processing techniques in addition to evaluation techniques for series of data. Generally speaking, the dimension of the preprocessed measurement dataset may thus also be increased in comparison with the measurement dataset, this allowing new possibilities for the evaluation. The described arrangement in the array also represents another ordered arrangement of the data such that neighborhood relationships are not lost. Since this is a form of representation, this assignment may in principle also be ensured in another way, such as for example by forming tuples, etc.

In addition to such a binning operation, one or more other operations may also, as an alternative or in addition, be described by the preprocessing algorithm, for example scaling, differentiation and integration.

Again with reference to FIG. 2: A classification algorithm is then applied to the preprocessed measurement dataset 221 in block 1003. The classification algorithm may comprise for example an ANN, that is to say, for example, a CNN. By applying the classification algorithm, at least one feature that is represented by the measurement dataset or by the preprocessed measurement dataset is classified. Classifying the at least one feature may mean that the at least one feature 277, 278 is detected (for example with an associated position 211) and the at least one feature is assigned to a particular classification group. By way of example, in connection with the application discussed above with regard to the evaluation of spectroscopic measured data, it could be detected whether the sample represented by the measurement data contains particular substances; different substances can bring about different characteristic fingerprints in the spectroscopic measured data that are able to be detected as features.

A quality of the classification of the at least one feature is then determined in block 1004. This may mean for example that the accuracy or reliability or speed with which the at least one feature was detected by applying the classification algorithm in block 1003 is determined.

Various techniques may in this case be used in order to determine the quality. In one example, it would be possible to determine the quality on the basis of a confidence level of the classification from block 1003. In further examples, it would be possible to take into consideration a comparison of the classification result of a plurality of classification algorithms when determining the quality: in some examples, it would be possible for not just a single classification algorithm to be applied in block 1003, but rather a multiplicity of different classification algorithms. By way of example, various ANNs could be applied, that is to say for example differently trained ANNs. It could then be possible to detect the at least one feature using the different classification algorithms. The quality may then be determined by comparing the classification results.

By way of example, the classification results could be compared with one another in a weighted manner, such that a first classification algorithm is taken into consideration in connection with the determination of the quality to a greater extent than a second classification algorithm. In this case, such weighting could be determined on the basis of properties of the corresponding classification result; by way of example, the weighting could be predefined depending on the physical and technical context of the measurement dataset.

It is then checked in block 1005 whether a stop criterion is met. It could by way of example be checked whether the quality determined in block 1004—for example an absolute value of the quality—exceeds a particular threshold value. As an alternative or in addition, a number of iterations of block 1004 could also be taken into consideration, or a change in the quality between two iterations of block 1004.

If the stop criterion in block 1005 is met, then the found value of the parameter of the preprocessing algorithm and/or the found one or more operations from the last iteration of block 1002 may be stored and used in the future; for this purpose, an assignment to the physical and technical context may for example be stored together with the configuration of the preprocessing algorithm. By way of example, the calibration phase could then be concluded. Further measurement datasets from further measurements could optionally be evaluated and classified (not illustrated in FIG. 2).

Otherwise, the value of the parameter of the preprocessing algorithm and/or the operation(s) in block 1006 is adjusted and a new iteration of blocks 1002-1005 is executed. It is apparent therefrom that applying the preprocessing algorithm in block 1002, applying the classification algorithm in block 1003, determining the quality in block 1004 and adjusting the preprocessing algorithm in block 1006 is repeated in an iterative loop.

In the various examples described herein, the value of more than one parameter of the preprocessing algorithm could also be adjusted. One or more operations associated with the preprocessing algorithm could also be adjusted or swapped.

A very wide variety of techniques are conceivable for adjusting the value of the parameter of the preprocessing algorithm in block 1006. By way of example, there could be a predefined list with a predefined order containing possible candidate values of the parameter of the preprocessing algorithm that is worked through in this order in the context of the iterative loop formed by blocks 1002-1006. In other examples, the value of the parameter could also be changed randomly or quasi-randomly.

In general, adjusting the value of the at least one parameter of the preprocessing algorithm could comprise applying a selection algorithm. The selection algorithm could describe the change in the value depending on the current quality from the respective iteration of block 1004. By way of example, a larger change in the value could be made if the current quality is comparatively low. By way of example, a larger change in the value could be made if a change in the quality between the two preceding iterations of block 1004 is comparatively low.

For example, the selection algorithm could comprise optimizing the quality by varying the value of the at least one parameter over a plurality of iterations of the loop. A very wide variety of optimizations are known, for example the Gauss Newton method, the gradient method, genetic algorithms, etc. Such optimizations make it possible to efficiently run through the available space of the values of the parameter such that a value of the parameter that corresponds to a maximum of the quality is able to be found quickly. In this case, the optimization may in particular describe the adjustment of the value between two iterations of the loop in block 1006. The optimization may thus define the selection algorithm.

It could for example be checked in the context of the optimization whether the quality between two successive iterations of the loop has changed significantly. If the quality has not changed significantly, then the last adjustment made to the value in the previous iteration of block 1006 could, for example, be annulled or dispensed with again. The associated value of the parameter could be marked as unsuitable.

It is apparent from the example of FIG. 2 that the value of the parameter of the preprocessing algorithm is able to be found through self-learning via feedback from the classification result, for example by way of an optimization.

Figure 5:
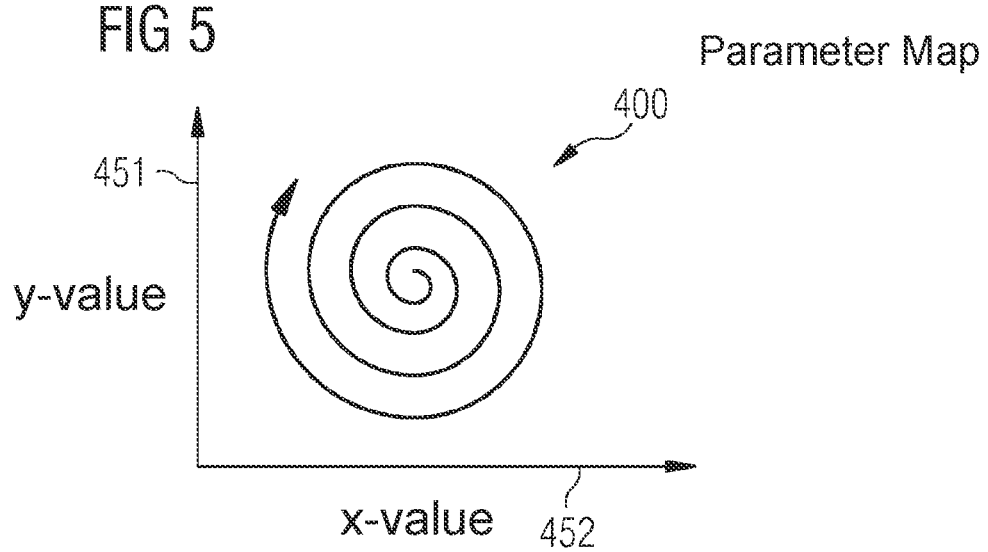
FIG. 5 schematically illustrates the adjustment of a preprocessing algorithm incorporating teachings of the present disclosure.

Such techniques may be varied and expanded. For example, in various examples, not only could the value of an individual parameter of the preprocessing algorithm be determined, but it would be possible to determine the values of a multiplicity of parameters of the preprocessing algorithm. This is illustrated for example in connection with FIG. 5, in which the value of the parameters 451 and 452 is changed by spiral-shaped sampling of the corresponding parameter space 400. It would furthermore also be possible in some examples also to adjust the operation used by the preprocessing algorithm throughout the variation of the value of a parameter of a given preprocessing algorithm. For example, the type of preprocessing of the measurement dataset could be adjusted by adjusting the preprocessing algorithm. By way of example, it would be possible to switch between different operations defined by the preprocessing algorithm in different iterations of the loop from blocks 1002-1006, that is to say for example between: scaling; binning; differentiation; and integration. The magnitude of the reduction in the number of data points between preprocessed measurement dataset and initial measurement dataset could be adjusted for different iterations by suitably dimensioning the corresponding parameter.

In further examples, the techniques described in connection with FIG. 2 could also be combined with a self-learning (further) classification algorithm; this classification algorithm could be applied to the measurement dataset and then the suitable preprocessing algorithm could be selected on the basis of the corresponding classification result. By way of example, a selection could thus be made from a list of the possible data preparation and/or data processing operations using an adaptive or self-learning ANN.

In summary, a description has been given above of techniques that make it possible to optimize a preprocessing algorithm that is used. By way of example, the amount of data to be taken into consideration in connection with the classification could be minimized by optimizing the preprocessing algorithm. The computational expenditure or the computing time is also able to be minimized via the optimized amount of data. A faster classification of features by way of a classification algorithm is thereby able to be achieved. The optimization of the preprocessing algorithm may also relate to accuracy of the classification algorithm; a particularly accurate classification is thereby able to be achieved. In general, the quality of the classification of features depending on the preprocessing algorithm that is used is thus able to be measured.

The features of the embodiments and aspects of the invention that are described above may obviously be combined with one another. The features may in particular be used not only in the described combinations but also in other combinations or on their own without departing from the field of the invention.

Various techniques in which the preprocessing algorithm brings about a reduction in the amount of data in the preprocessed measurement dataset in comparison with the measurement dataset have been described above for example for illustrative purposes. In other examples, however, it would also be possible for the amount of data in the preprocessed measurement dataset to be increased in comparison with the measurement dataset, for example taken into consideration by a binning operation in the case of different starting values for the compilation of neighboring data points.

The invention claimed is:

1. A method for processing a data set using a processor, said method comprising:
   obtaining a measurement dataset;
   applying a preprocessing algorithm to the measurement dataset using the processor to obtain a preprocessed measurement dataset;
   applying a classification algorithm to the preprocessed measurement dataset using the processor to classify a feature represented by the measurement dataset;
   determining a quality of the classification of the feature using the processor; and
   adjusting the preprocessing algorithm based on the determined quality using the processor;
   wherein adjusting the preprocessing algorithm comprises applying a selection algorithm;
   wherein the selection algorithm describes the change in a value of a parameter of the preprocessing algorithm depending on the determined quality;
   wherein the preprocessing algorithm comprises applying at least one operation to the measurement dataset, the at least one operation selected from the group consisting of: binning; differentiation; integration; and forming tuples having a predetermined relationship from the measurement dataset.

2. The method as claimed in claim 1, further comprising forming the tuples using a Poincaré section.

3. The method as claimed in claim 1, wherein the predetermined relationship represents a physical and technical context of the measurement dataset selected from the group consisting of: temporal, spatial, energy-based, frequency-based, and wavelength-based relationship.

4. The method as claimed in claim 1, further comprising:
   determining a physical and technical context of the measurement dataset; and
   selecting an operation used by the preprocessing algorithm from a multiplicity of candidate operations based on the determined physical and technical context of the measurement dataset.

5. The method as claimed in claim 4, further comprising applying a further classification algorithm to the measurement dataset to determine the physical and technical context of the measurement dataset.

6. The method as claimed in claim 1, wherein the application of the preprocessing algorithm, the application of the classification algorithm, the determination of the quality and the adjustment of the preprocessing algorithm is repeated in an iterative loop over a plurality of iterations.

7. The method as claimed in claim 6, wherein the iterative loop has a stop criterion selected from the group consisting of: number of iterations; change in the quality of the classification between two iterations; and absolute value of the quality of the classification.

8. The method as claimed in claim 6, wherein the selection algorithm comprises optimizing the quality by changing the value of the parameter over a plurality of iterations of the loop.

9. The method as claimed in claim 1, wherein the selection algorithm determines the change in the value of the parameter depending on at least one of the following elements: a physical and technical context of the measurement dataset; a classification result of the classification algorithm; and the quality.

10. The method as claimed in claim 1, further comprising:

applying at least one further classification algorithm to the preprocessed measurement dataset to classify the feature, wherein the at least one further classification algorithm is different from the classification algorithm; and comparing a classification result of the at least one further classification algorithm with a classification result of the classification algorithm;

wherein the quality is determined based on the comparison.

11. The method as claimed in claim 10, wherein the comparison takes into consideration different weights for the classification result of the at least one further classification algorithm and for the classification result of the classification algorithm.

12. The method as claimed in claim 1, wherein the preprocessing algorithm brings about a change in an amount of data in the preprocessed measurement dataset in comparison with the measurement dataset.

13. The method as claimed in claim 1, further comprising training the classification algorithm based on reference measurement datasets;

wherein the preprocessing algorithm is not trained or is trained separately from the classification algorithm.

14. A device comprising:

a computer unit; and a memory storing program code in a non-transitory storage;

wherein the computer unit is configured to load and execute the program code from the memory, causing the computer unit to execute a method comprising:

obtaining a measurement dataset;

applying a preprocessing algorithm to the measurement dataset to obtain a preprocessed measurement dataset;

applying a classification algorithm to the preprocessed measurement dataset to classify a feature represented by the measurement dataset;

determining a quality of the classification of the feature; and adjusting the preprocessing algorithm based on the determined quality;

wherein adjusting the preprocessing algorithm comprises applying a selection algorithm;

wherein the selection algorithm describes the change in a value of a parameter of the preprocessing algorithm depending on the determined quality;

wherein the preprocessing algorithm comprises applying at least one operation to the measurement dataset, the at least one operation selected from the group consisting of: binning; differentiation; integration; and forming tuples having a predetermined relationship from the measurement dataset.

* * * * *